(No Model.) 3 Sheets—Sheet 1.
R. A. PERROTT.
KITCHEN RANGE OR COOKING STOVE.
No. 394,293. Patented Dec. 11, 1888.
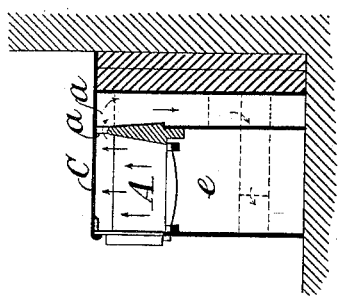
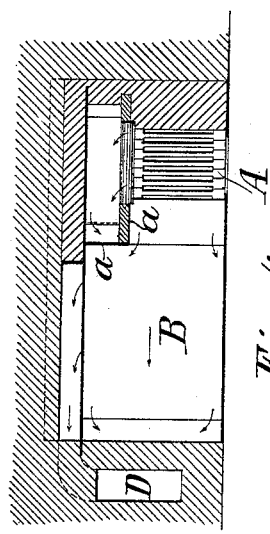
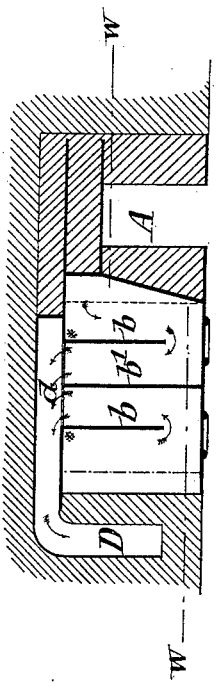
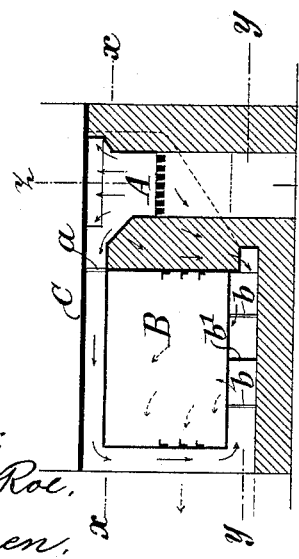
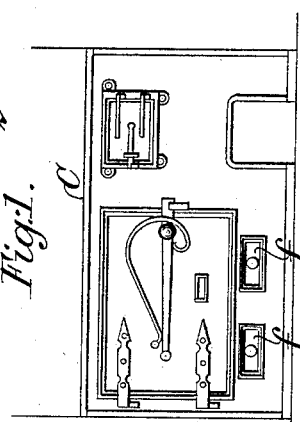
Witnesses:
Joseph W. Roe.
C. L. Sundgren.
Inventor:
Richard Atkinson Perrott.
By attorneys
Brown & Hall.

(No Model.) 3 Sheets—Sheet 2.
R. A. PERROTT.
KITCHEN RANGE OR COOKING STOVE.
No. 394,293. Patented Dec. 11, 1888.
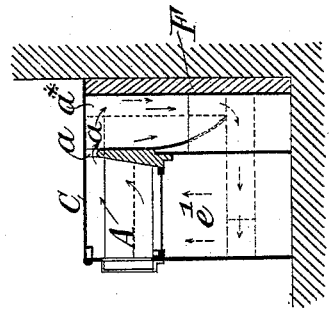
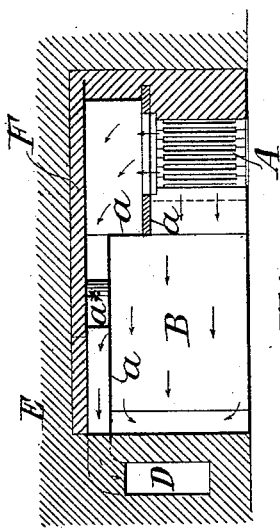
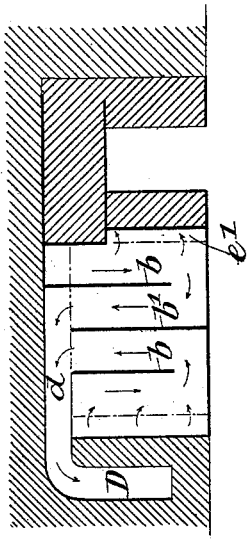
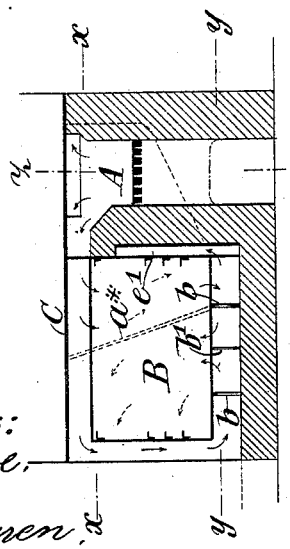
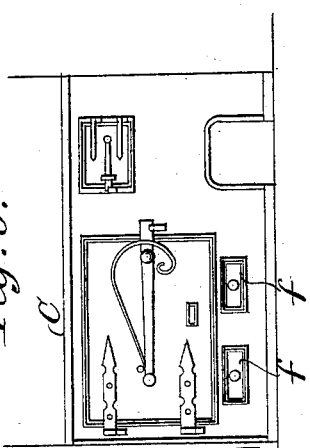
Witnesses:
Jos. W. Roe
C. L. Sundgren
Inventor:
Richard Atkinson Perrott,
by attorneys
Brown & Hall.

(No Model.) 3 Sheets—Sheet 3.
R. A. PERROTT.
KITCHEN RANGE OR COOKING STOVE.
No. 394,293. Patented Dec. 11, 1888.
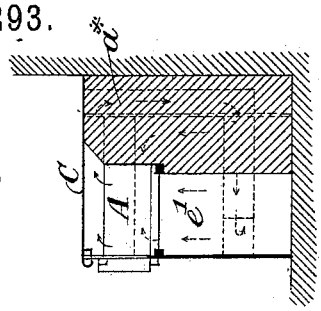
Fig: 15.
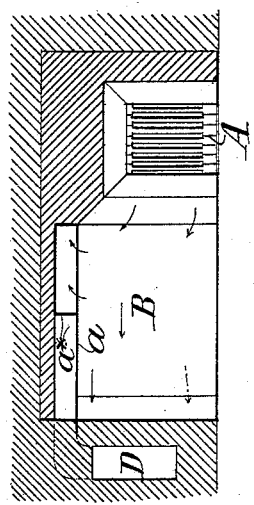
Fig: 13.
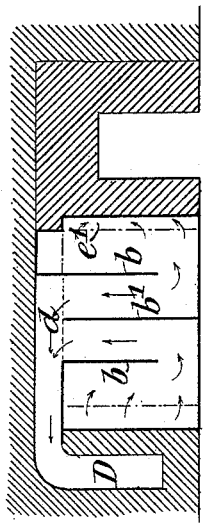
Fig: 14.
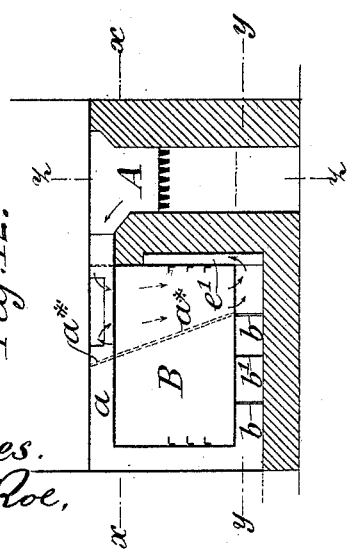
Fig: 12.
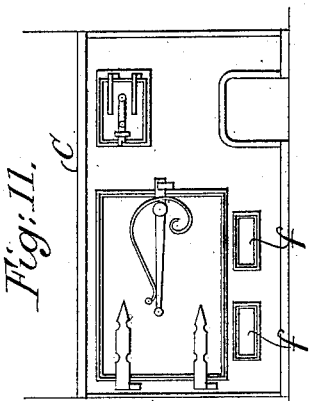
Fig: 11.
Witnesses.
Jos. W. Roe,
C. L. Sundgren.
Inventor:
Richard Atkinson Perrott,
By Attorneys
Pinnet Hall.

UNITED STATES PATENT OFFICE.

RICHARD ATKINSON PERROTT, OF CORK, COUNTY OF CORK, IRELAND.

KITCHEN-RANGE OR COOKING-STOVE.

SPECIFICATION forming part of Letters Patent No. 394,293, dated December 11, 1888.

Application filed March 22, 1888. Serial No. 268,120. (No model.) Patented in England April 29, 1885, No. 5,315.

*To all whom it may concern:*

Be it known that I, RICHARD ATKINSON PERROTT, a subject of the Queen of Great Britain, and a resident of Cork, in the county of Cork, Ireland, have invented certain new and useful Improvements in Kitchen-Ranges or Cooking-Stoves, (for which I have obtained a Patent in Great Britain, No. 5,315, dated April 29, 1885,) of which the following is a full, clear, and exact specification.

My invention relates to the economical and uniform heating of ovens, and it may be the boilers also, in kitchen ranges or stoves.

The invention consists in the combination, in a kitchen-range, of a fire-box, an oven, a plate above said oven at a distance therefrom, a division-plate beneath the oven dividing the space beneath the oven into two different passages for the products of combustion, a flue at one end of the oven for conveying products of combustion to one of said passages, a flue at the back of the oven for conveying products of combustion to the other of said passages, a bridge-wall over which the products of combustion pass from the fire-box to the flue last named, and deflectors in each of said passages for causing the products of combustion passing through said passages to pursue a circuitous course, substantially as specified.

Figure 1 is a front elevation of a range. Fig. 2 is a longitudinal sectional elevation of the same, taken on or about the line $w$ $w$, Fig. 4. Fig. 3 is a horizontal section on the line $x$ $x$ of Fig. 2. Fig. 4 is a horizontal section on the line $y$ $y$ of Fig. 2. Fig. 5 is a transverse vertical section on the line $z$ $z$ of Fig. 2. Fig. 6 is a front elevation of a range. Fig. 7 is a longitudinal sectional elevation of the same, taken immediately behind the front. Fig. 8 is a horizontal section on the line $x$ $x$, Fig. 7. Fig. 9 is a similar section on the line $y$ $y$, Fig. 7; and Fig. 10 is a transverse vertical section on the line $z$ $z$, Fig. 7. Fig. 11 is a front elevation of a range. Fig. 12 is a longitudinal sectional elevation of the same, taken immediately behind the front. Fig. 13 is a horizontal section taken on the line $x$ $x$, Fig. 12. Fig. 14 is a horizontal section on the line $y$ $y$, Fig. 12; and Fig. 15 is a transverse vertical section on the line $z$ $z$, Fig. 12.

The setting of the cooking ranges or stoves illustrated in the drawings, Figs. 6 and 15, it should be observed, varies slightly from that shown in the first five figures, and the partitions at the back of these stoves are arranged to correspond with such variation.

It will of course be understood that the relative positions of the fire-box and oven might be reversed in all or any of the several arrangements shown in the drawings, and that the fire might be placed between two ovens, or that two ovens might be placed at one or both sides of the fire, or, again, that one oven might be placed at one side of the fire and two ovens at the other side without departing from the tenor of my invention, or that the cooking stove or range, instead of being set in masonry, might be made to stand independent and self-contained, lined up and inclosed with plates of iron or other material and standing on feet or otherwise; but with the view of simplifying the description and more readily explaining the invention the same relative position of these parts has been observed in all the figures.

Similar letters refer to similar parts throughout the drawings, in which—

A is the fire-box, B the oven, and C the hot plate.

$a$ indicates a vertical partition or division plate situated toward the back of the range, rising from the top of oven and touching the under side of hot plate.

$b$ $b$ indicate the baffle plates or deflectors for giving a circuitous course to the hot gases below the oven, and $b'$ is the division-plate for keeping separate the streams of hot gases, preferably two in number, into which the products of combustion from the fire are divided until they reach the point $d$.

In the arrangement shown in Figs. 1 to 5 it will be seen that the products of combustion from A pass off by two distinct passages or channels in the direction indicated by the arrows, the one stream sweeping over the top of the oven B, beneath the hot plate C, down the side of the oven remote from A, around the baffle-plate $b$, below the left-hand half of the oven, and thence to the flue D, the other stream passing down at the back of the range by a portion of the side of the oven nearest the fire-box to the bottom of the oven, around the baffle-plate $b$, below the right-hand half of the oven, and thence to the flue D. It will be observed that the two streams of gases issuing from below the oven toward the back blend and unite at the point d, and before passing to the flue fill the entire space at the back of the oven, thereby completing its heating practically all round. I say "practically all round," because on reference to Fig. 5 it will be seen that a small portion of the side of the oven below the level of the fire-bars and in advance of the passage at the back, by which the stream of gases passes to the space below the right-hand half of the oven, (which small portion I have marked e in this figure,) is not directly heated, though the thickness of the brick or fire-clay setting at that part is sufficient to prevent it from being cooled to any appreciable extent by the proximity of the ash-pit. The said portion, however, might be, and preferably is, provided with a hot-air or gas chamber on its outer side between the wall of the oven and the brick or fire-clay setting, as shown best at $e'$ in Figs. 7 and 12, and this allows of the brick setting at this part being thinner, and enables me more completely to distribute the heat evenly on all sides of the oven.

In the arrangement shown in Figs. 6 to 10 the position of the vertical partition a toward the back of the range which separates the two streams of gases remains the same; but an extra partition, $a^*$, is fixed at the back of the oven. This partition traverses the back of oven from top to bottom in a slanting direction, and the internal form of the passage through which the gases descend to the circuitous passages below the oven is somewhat altered. With the division-plate a in this position one portion of the back of the oven is heated by a descending stream of gases, and the other portion of the back of the oven is heated by the combined or united ascending streams of gases, as clearly indicated by the arrows, the arrangement of the baffles or deflectors below the oven remaining substantially the same as described with reference to Figs. 1 to 5.

The part of the setting marked E in Fig. 8 I prefer should be of brick, while that marked F in the same figure may be a rubble filling.

The arrangement shown in Figs. 6 to 10 affords a pretty equal division of the gases of combustion and their equable distribution over the two halves of the oven, after which the united streams pass off, as before explained, by the common flue D.

In Figs. 11 to 15 I have shown the same principle of action embodied in a very simple form of range or stove, which can be set very easily and inexpensively, and in which I am able to dispense with the passage at the back of the fire-box, and although the arrangements shown in Figs. 1 to 10 are very useful and efficient for the purpose of my invention, yet the distribution of the heated gases on all sides of the oven is effected with even greater economy, directness, and simplicity by the arrangement shown in Figs. 11 to 15. As in the preceding examples, $a^*$ is the vertical or practically vertical partition, situate at the back of the oven, which separates the stream of gas. b b, as before, are the baffles, which deflect the divided streams beneath the right and left hand halves of the oven, respectively, and $e'$ is the hot-air or gas chamber, covering that portion of the side of the oven which is adjacent to the ash-pit and which is supplied with heated air or gases by the stream which heats the right-hand half of the oven. The arrows indicate clearly the passage of the two streams in this arrangement. One stream passes straight across the top of the oven B, beneath the hot plate, down by the left side of the oven, through the circuitous passage formed by the baffles below the left half of the oven to d, where it meets with the other stream of gas, which, sweeping across the right-hand corner of the top of the oven at the back, descends behind it to the circuitous passage formed by the baffles below the right-hand half of the oven, the united streams rising behind the remaining back half or portion of the oven and passing off by the flue D, as before.

I would here observe that the precise position and direction of the flue D form no part of the present invention. The said flue might be at the back of the range or in any other position which may be found suitable, and it may run in any convenient direction. The dampers for controlling the currents of heated gases, when used, are most conveniently situated in the positions indicated at f in Figs. 1, 6, and 11, each being opposite the end of one of the baffle-plates b b, forming the sets of circuitous passages below the oven, and here are also cleaning-doors affording facilities for cleaning the flues. The dampers may be arranged to slide or may be of leaf form mounted on a spindle capable of rotation. The interior of the oven is fitted with ledges for shelves, as indicated in Figs. 2, 7, and 12.

When my improvements are applied to ranges having a very large oven or ovens, I increase the number of baffles—such as b—beneath the oven or ovens, while for ranges with very small ovens the single baffle-plate on each side may be shifted nearer to the right and left, respectively, so as to allow sufficient width to the flues or passages on each side of the division-plate under the center of the oven. I may also cause the gases to sweep through the hot-air chamber $e'$ at the side of the oven next the ash-pit, thus converting it into a flue or passage. This flue along the side of the oven is of course not required to extend above the level of the fire-bars, and is, in fact, exactly the same as the hot-air or gas chamber $e'$, described with reference to Figs. 7 and 12, except that its back end is open direct to the vertical or sloping flue at the back of the range, and the gases consequently circulate through it. With the object of more completely filling the corners of the passages, flues, or chambers formed by the baffles below the oven when the arrangement shown in Figs. 2 to 5 is employed, small openings may be left at the point of attachment between the said baffles and the back plate to induce small currents, or what may be termed "leakage," of the hot gas to permeate and fill the said corners. The positions of these openings is indicated by stars in Fig. 4.

The invention, by a mere duplication or repetition of parts, may be applied to a range having a boiler at one side and an oven on the other side of the fire-box, or to ranges with various combinations of ovens and boilers.

In conclusion, I would remark that I am aware that it has been proposed to fit a perforated plate or block, of cast-iron or other material, between the fire-box and the adjacent side of the oven or boiler for the purpose of separating the gases of combustion into two streams, which are intended to pass the one over the top of the perforated plate or block and across the top of the oven or boiler and the other through the perforations or apertures in the said plate or block down by the side of the oven or boiler to a space below the same. I am also aware that it has been proposed to fit the said space with baffle-plates or deflectors; but these arrangements are open to the following objections: The edges of the plate or block between and around the perforations or apertures (whether vertical or horizontal) will not stand the action of the fire, but soon burn away or break, and the apertures themselves, through which one portion of the gases of combustion is expected to pass, are liable to become choked with fuel and ashes, as, owing to the clear space required between the top of the plate or block and the under side of the hot plate, (for the passage of one of the streams of hot gases—viz., that which passes over the oven,) these apertures must be situate comparatively low down in the fire-box. Owing to the position of these apertures also with reference to the oven or boiler the stream of hot gases which descends at the side of oven nearest the fire-box does not heat any portion of the back of the oven in its descent. It also leaves a great portion of the bottom of oven without heat, while, as regards the baffles in the arrangement above referred to, no division-plate has been used to completely separate the two streams of gases below the oven, and hence the currents are liable to conflict and impede each other. By the present improvements, however, all these defects are obviated.

Having thus described my invention, what I claim as new, and desire to secure by Letters Patent, is—

In a kitchen range, the combination, with a fire-box, of an oven, a plate above said oven at a distance therefrom, a division-plate beneath the oven dividing the space beneath the oven into two separate passages for the products of combustion, a flue at one end of the oven for conveying products of combustion to one of said passages, a flue at the back of the oven for conveying products of combustion to the other of said passages, a bridge-wall over which the products of combustion pass from the fire-box to the flue last named, and deflectors in each of said passages for causing the products of combustion passing through said passages to pursue a circuitous course, substantially as specified.

RICHARD ATKINSON PERROTT.

Witnesses:
   WM. VERLING GREGG,
      *Not. Pub., 67 South Mall, Cork;*
   JOHN GEOHEGAN,
      *67 South Mall, Cork, Law Clerk.*